T. I. Wells,
Cider Mill.
No. 1,739. Patented Aug. 25, 1840.
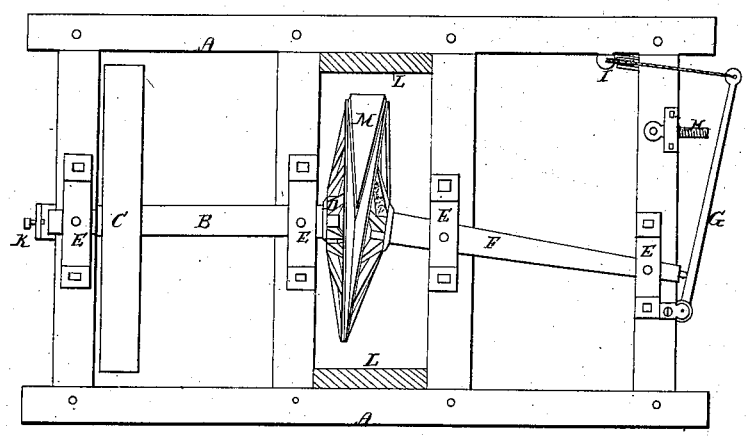
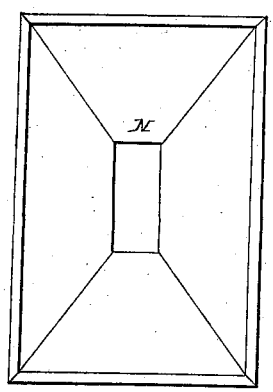
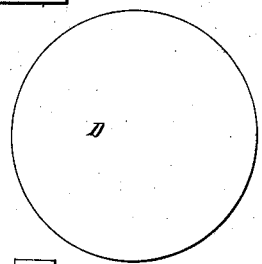
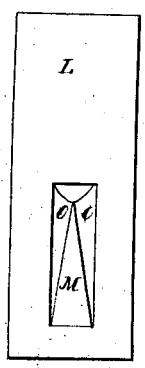
Witnesses:
Inventor,
Thomas I. Wells

UNITED STATES PATENT OFFICE.

THOMAS I. WELLS, OF NEW YORK, N. Y.

MACHINE FOR GRINDING APPLES AND OTHER FRUIT.

Specification of Letters Patent No. 1,739, dated August 25, 1840.

*To all whom it may concern:*

Be it known that I, THOMAS I. WELLS, of the city, county, and State of New York, have invented a new and useful Machine for the Purpose of Grinding or Crushing Apples and other Fruit; and I hereby declare that the following is a full and exact description.

The invention is called "Wells' improved apple mill."

The nature of it consists in moving together two slightly conical disks the apices of which meet.

To enable others skilled in the business to make and use my invention I proceed to describe its construction and operation, reference being had to the drawings hereunto annexed and making part of this specification.

Plate I, Figure 1, of the drawings is a plan or longitudinal section; Fig. 2, the face of the conical disk. Plate II, Fig. 3, side elevation; Fig. 4 end elevation; Fig. 5 the hopper; Fig. 6 the cap board in which is the outlet of the hopper.

The same letters refer to the same things in all the figures.

A, the frame of the machine; B, one of the shafts, on which is the band wheel C, by which the machine is driven; D, the disks. The fans of these are cones very much depressed; E, the boxes made strong and firm to hold the shafts in their position; F, one of the shafts. This is inclined at an angle to the side of the machine, so as to bring the sides of the conical disks together.

G, is a lever the purpose of which is to press the disk of the shaft F firmly against the other. The gage screw H is to regulate the nearness of its approach to the other. The weight I is for keeping it constantly pressed firmly to its place.

K, is a gage screw for regulating the other shaft and disk; L, the side uprights and cap of the box inclosing the disk; N, the hopper in which the apples are put to be crushed; M and O, the outlet or conductor of the hopper extending down between the disks to conduct the apples to the side of contact where they are crushed; P, the ribs or radii of the disks generally inserted in the shafts in the manner that spokes are set in a hub of a carriage wheel.

The purpose of this machine is effected simply by the action of the two conical disks. They are the same size and shape. They are on the fans which run together cone shaped the apex being elevated about one twelfth part of the diameter of the disk and smooth surface. They are placed together so that the apices meet. The shaft F of one of them is so inclined toward the side of the machine that the sides of the disk shall meet in this position being revolved together they will crush whatever is placed between them for the purpose. The outlet M, O of the hopper conducts the apples to the place of contact of the two disks.

To obviate damage to the machine from stones, or other hard substances the disk upon the inclined shaft F is allowed to yield and let them pass. The shaft for this purpose is made to slide in its boxes E until the stone has passed through when by the pressure of the lever G with the weight I the disk is again brought into contact with the other.

What I claim as my invention and desire to secure by Letters Patent is—

The mode above described of crushing apples or other fruit, by the action and combination of the two conical disks D combined with the lever and pulley.

THOMAS I. WELLS.

Witnesses:
JOHN M. COOPER,
W. JAY HACKETT.